United States Patent
Cai et al.

(10) Patent No.: US 11,562,178 B2
(45) Date of Patent: Jan. 24, 2023

(54) ADAPTIVE SAMPLING FOR IMBALANCE MITIGATION AND DATASET SIZE REDUCTION IN MACHINE LEARNING

(71) Applicant: Oracle International Corporation, Redwood Shores, CA (US)

(72) Inventors: Jingxiao Cai, Newark, CA (US); Sandeep Agrawal, San Jose, CA (US); Sam Idicula, Santa Clara, CA (US); Venkatanathan Varadarajan, Seattle, WA (US); Anatoly Yakovlev, Hayward, CA (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 575 days.

(21) Appl. No.: 16/718,164

(22) Filed: Dec. 17, 2019

(65) Prior Publication Data
US 2020/0342265 A1    Oct. 29, 2020

Related U.S. Application Data

(60) Provisional application No. 62/840,194, filed on Apr. 29, 2019.

(51) Int. Cl.
*G06K 9/62* (2022.01)
*G06N 20/00* (2019.01)

(52) U.S. Cl.
CPC ........... *G06K 9/6262* (2013.01); *G06K 9/628* (2013.01); *G06K 9/6256* (2013.01); *G06N 20/00* (2019.01)

(58) Field of Classification Search
CPC .... G06K 9/6262; G06K 9/6256; G06K 9/628; G06N 20/00; G06N 20/20; G06N 20/10;
(Continued)

(56) References Cited

U.S. PATENT DOCUMENTS 6,278,989 B1 * 8/2001 Chaudhuri ........ G06F 16/24542
7,827,123 B1 * 11/2010 Yagnik .................. G06N 20/00
706/12

(Continued)

FOREIGN PATENT DOCUMENTS

WO    WO 2008/133509 A1    11/2008

OTHER PUBLICATIONS

Trond et al., "Impact of Training Dataset Size on Neural Answer Selection Models" ROBOCUP 2008, dated Apr. 7, 2019, pp. 828-835.

(Continued)

*Primary Examiner* — Lewis G West
(74) *Attorney, Agent, or Firm* — Hickman Becker Bingham Ledesma LLP (57) ABSTRACT

According to an embodiment, a method includes generating a first dataset sample from a dataset, calculating a first validation score for the first dataset sample and a machine learning model, and determining whether a difference in validation score between the first validation score and a second validation score satisfies a first criteria. If the difference in validation score does not satisfy the first criteria, the method includes generating a second dataset sample from the dataset. If the difference in validation score does satisfy the first criteria, the method includes updating a convergence value and determining whether the updated convergence value satisfies a second criteria. If the updated convergence value satisfies the second criteria, the method includes returning the first dataset sample. If the updated convergence value does not satisfy the second criteria, the method includes generating the second dataset sample from the dataset.

20 Claims, 5 Drawing Sheets

(58) Field of Classification Search
CPC ........ G06N 3/084; G06N 3/126; G06N 5/003; G06N 7/005

See application file for complete search history.

(56) References Cited

U.S. PATENT DOCUMENTS

| | | | |
|---|---|---|---|
| 7,849,032 B1 | 12/2010 | Campos et al. | |
| 11,151,480 B1* | 10/2021 | Golovidov | G06F 16/904 |
| 2002/0169735 A1 | 11/2002 | Kil et al. | |
| 2003/0176931 A1* | 9/2003 | Pednault | G06K 9/6256 700/44 |
| 2014/0344193 A1 | 11/2014 | Bilenko et al. | |
| 2018/0022539 A1 | 1/2018 | Vedani | |
| 2018/0046926 A1 | 2/2018 | Achin | |
| 2018/0225391 A1* | 8/2018 | Sali | G06F 7/588 |
| 2018/0293462 A1* | 10/2018 | Ambati | G06N 5/022 |
| 2018/0293501 A1* | 10/2018 | Ambati | G06N 5/02 |
| 2019/0095785 A1 | 3/2019 | Sarkar et al. | |
| 2019/0095818 A1* | 3/2019 | Varadarajan | G06N 20/20 |
| 2019/0095819 A1* | 3/2019 | Varadarajan | G06N 5/003 |
| 2019/0125268 A1* | 5/2019 | Taulu | A61B 5/369 |
| 2019/0188212 A1* | 6/2019 | Miller | G06N 7/005 |
| 2019/0295000 A1* | 9/2019 | Candel | G06N 5/02 |
| 2019/0377610 A1 | 12/2019 | Gupta et al. | |
| 2019/0392255 A1 | 12/2019 | Franklin | |
| 2020/0042893 A1* | 2/2020 | Hunt | G16H 10/00 |
| 2020/0082013 A1 | 3/2020 | Triplet et al. | |
| 2020/0089917 A1 | 3/2020 | Skourtis et al. | |
| 2020/0118036 A1* | 4/2020 | Karnagel | G06N 3/084 |
| 2020/0125044 A1* | 4/2020 | Ide | G06N 3/08 |
| 2020/0285899 A1* | 9/2020 | Chen | G06N 20/00 |
| 2021/0117869 A1* | 4/2021 | Plumbley | G06K 9/6227 |
| 2021/0182739 A1* | 6/2021 | Farooq | G06N 5/04 |
| 2021/0390466 A1 | 12/2021 | Varadarajan et al. | |
| 2022/0059189 A1* | 2/2022 | Rosing | G06F 16/90335 |
| 2022/0121955 A1* | 4/2022 | Chavoshi | G06N 3/088 |
| 2022/0328132 A1* | 10/2022 | Kubinski | G16B 25/10 |
| 2022/0366282 A1* | 11/2022 | Makrehchi | G06N 5/046 |

OTHER PUBLICATIONS

Petrak et al., "On the Use of Fast Subsampling Estimates for Algotithm Recommendation", dated Nov. 1, 2020, 10 pages.

Huang et al., "ABC: Efficient Selection of Machine Learning Configuration on Large Dataset", ARXIV.org, Cornell University Library, dated Nov. 8, 2018, 12 pages.

G.H John et al., "Static Versus Dynamic Sampling for Data Mining" KDD-96 Proceedings, dated Dec. 31, 1996, 4 pages.

Francois Portet et al., "Reduction of Lage Traning Set by Guided Progressive Sampling: Application to Neonatal Intensive Care Data", dated Jan. 1, 2001, 2 pages.

Foster Provost et al., "Efficient Progressive Sampling", Proceedings/ KDD-99, The fifth ACM Sigkdd International Conference on Knowledge Discovery and Data Mining, dated Aug. 1, 1999, pp. 23-32.

Figueroa et al., "Predicting Sample Size Required for Classification Performace", BMC Medical Informatics and Decision Making, Biomed Central, vol. 12 No. 1, dated Feb. 15, 2012, 10 pages.

Snoek, "Practical Bayesian Optimization of Machine Learning Algorithms", dated 2012, 9 pages.

Snoek et al., "Scalable Bayesian Optimization Using Deep Neural Networks", dated 2014, 10 pages.

Snoek et al, "Input Warping for Bayesian Optimization of Non-Stationary Functions", Proceedings of the 31 st International Conference on Machine Learning, Beijing, China, 2014, 9 pages.

Scikit Learn, "3.2. Tuning the hyper-parameters of an estimator", http://scikitlearn.org/stable/modules/grid_search.html, dated 2017, 6 pages.,.

Pedregosa, Fabian, "Hyperparameter Optimization with Approximate Gradient", Proceedings of the 33rd International Conference on Machinelearning, New York, vol. 48, dated Jun. 26, 2016, pp. 1-15.

Nelder et al., "A Simplex Method for Function Minimization", The Computer Journal, vol. 7, dated Apr. 1, 1964, pp. 308-313.

Hutter et al., "Sequential Model-Based Optimization for General Algorithm Configuration", dated 2011, 15 pages.

Gonzalez et al., "Batch Bayesian Optimization via Local Penalization", Proceedings of the 19th International Conference on Artificial Intelligence and Stats JMLR: W&CP vol. 41, dated 2016, 10 pages.

Gonnet et al., Automatic Problem-Specific Hyperparameter Optimization and Model Selection for Supervised Machine Learning, Technical Report, dated Jan. 1, 2015, 54 pages.

Chen Chi-Ou et al., "Machine Learning-Based Configuration Parameter Tuning on Hadoop System", dated Jun. 27, 2015, IEEE, pp. 386-392.

Bergstra et al., "Random Search for Hyper-Parameter Optimization", Journal of Machine Learning Research 13 (2012) 281-305, dated Feb. 2012, 25 pages.

Bergstra et al., "Making a Science of Model Search: Hyperparameter Optimization in Hundreds of Dimensions for Vision Architectures", JMLR: W &CP, vol. 28, dated 2013, 9 pages.

Andrychowicz et al., "Learning to learn by gradient descent by gradient descent", 30th Conference on Neural Information Processing Systems dated (NIPS 2016), Barcelona, Spain, 9 pages.

Lin et al., "Experiencing SAX: a novel symbolic representation of time series", dated Apr. 3, 2007, 38 pages.

Abe et al., "Developing an Integrated Time-Series Data Mining Environment for Medical Data Mining", Seventh IEEE International Conference on Data Mining—Workshops, dated 2007, 6 pages.

Ahmed et al., "An Empirical Comparison of Machine Learning Models for Time Series Forecasting", dated Sep. 15, 2010, 31 pages.

Amazon SageMaker, "DeepAR Forecasting Algorithm", https:// docs.aws.amazon.com/sagemaker/latest/dg/deepar.html,last viewed on Jun. 29, 2020, 5 pages.

Artificial Intelligence Blog, "Announcing automated ML capability in Azure Machine Learning", dated Sep. 24, 2018, 8 pages.

Brownlee, Jason, "Time Series Forecasting as Supervised Learning", dated Aug. 21, 2019, 2 pages.

Camerra et al., "Beyond one billion time series: indexing and mining very large time series collections with iSAX2+", dated Feb. 16, 2013, 29 pages.

"Machine Learning Approaches for Time Series Data" dated May 19, 2019, 25 pages.

Kraska, Tim, "Northstar: An Interactive Data Science System", Proceedings of the VLDB Endowment, vol. 11, No. 12 Copyright 2018 VLDB Endowment, 15 pages.

Wang et al., "Experimental comparison of representation methods and distance measures for time series data", dated Feb. 12, 2010, 35 pages.

Ng, "Data preprocessing for machine learning: options and recommendations", dated Jun. 22, 2020, 12 pages.

Olson et al., "Evaluation of a Tree-based Pipeline Optimization Tool for Automating Data Science", dated Mar. 20, 2016, 8 pages.

Oracle, "The Oracle AutoML Pipeline" Four Main Stages, https:// docs.cloud.oracle.com/en-us/iaas/tools/ads-sdk/latest/user_guide/ automl/overview.html, dated Apr. 28, 2020 or later, 4 pages.

Paoli et al., "Forecasting of preprocessed daily solar radiation time series using neural networks", Solar Energy, Elsevier, dated 2010, 43 pages.

Plotz et al., "Feature Learning for Activity Recognition in Ubiquitous Computing", dated Jan. 2011, 7 pages.

Schoenfeld et al., "Preprocessor Selection for Machine Learning Pipelines", dated 2018, 7 pages.

Song et al., "Deep r -th Root of Rank Supervised Joint Binary Embedding for Multivariate Time Series Retrieval", KDD 2018, dated Aug. 19-23, 2018, London, United Kingdom, 10 pages.

Faloutsos et al., "Fast Subsequence Matching in Time Series Databases", dated 1998, 11 pages.

Varadarajan, U.S. Appl. No. 16/137,719, filed Sep. 21, 2018, Notice of Allowance, dated Aug. 4, 2021.

Varadarajan, U.S. Appl. No. 16/137,719, filed Sep. 21, 2018, Notice of Allowance, dated Jul. 9, 2021.

Varadarajan, U.S. Appl. No. 16/137,719, filed Sep. 21, 2018, Interview Summary, dated Jul. 9, 2021.

(56) References Cited

OTHER PUBLICATIONS

Varadarajan, U.S. Appl. No. 15/885,515, filed Jan. 31, 2018, Office Action, dated Jun. 17, 2021.
Varadarajan, U.S. Appl. No. 15/885,515, filed Jan. 31, 2018, Notice of Allowance, dated Aug. 4, 2021.
Varadarajan, U.S. Appl. No. 15/885,515, filed Jan. 31, 2018, Notice of Allowance, dated Jul. 26, 2021.
Zhang et al., "Privacy-Preserving Machine Learning through Data Obfuscation", Jul. 2018, 12 pages.
Hsu et al., "A Practical Guide to Support Vector Classification", May 19, 2016, National Taiwan University, 2016, pp. 1-16.
Brochu et al., "A Tutorial on Bayesian Optimization of Expensive Cost Functions, with Application to Active User Modeling and Hierarchical Reinforcement Learning", Dec. 14, 2010, pp. 1-49.
Bhide, Manish, "Understanding Model Drift with IBM Watson OpenScale", Medium, Trusted AI, available: https://medium.com/trusted-ai/understanding-model-drift-with-ibm-watson-openscale-4c5401aa8da4, 2019.
Provost, Foster "Machine Learning from Imbalanced Data Sets 101", in Proceedings of the AAAI'2000 Workshop on Imbalanced Data Sets, dated 2003, 3 pages.
Bolin et al., "A Perceptually Based Adaptive Sampling Algorithm", in Proceedings of the 25th Annual Conference on Computer Graphics and Interactive Techniques, dated Jul. 1998, 11 pages.
Cai et al., "Diagnosis and Classification of Typhoon-Associated Low-Altitude Turbulence Using HKO-TDWR Radar Observations and Machine Learning", IEEE Transactions on Geoscience and Remote Sensing, vol. 57, Iss. 6, dated Jun. 2019, 16 pages.
Chawla et al., "SMOTE: Synthetic Minority Over-Sampling Technique", Journal of Artificial Intelligence Research, vol. 16, dated Jun. 2002, 37 pages.
Ertekin et al., "Learning on the Border: Active Learning in Imbalanced Data Classification", in Proceedings of the 16th ACM Conference on Information and Knowledge Management, dated Nov. 2007, 77 pages.
Flajolet et al., "HyperLogLog: The Analysis of a Near-Optimal Cardinality Estimation Algorithm", Conference on Analysis of Algorithms, Discrete Mathematics and Theoretical Computer Science, dated Jan. 2007, 22 pages.
Heule et al., "HyperLogLog in Practice: Algorithmic Engineering of a State of The Cardinality Estimation Algorithm", Proceedings of the 16th International Conference on Extending Database Technology, dated Mar. 2013, 10 pages.
Lemaitre et al., "Imbalanced-Learn: A Python Toolbox to Tackle the Curse of Imbalanced Datasets in Machine Learning", in Journal of Machine Learning Research, vol. 18, No. 1, dated Jan. 2017, 5 pages.
Bishop et al., "Adaptive Sampling with the Ensemble Transform Kalman Filter. Part I: Theoretical Aspects", Monthly Weather Review, vol. 129, Iss. 3, dated Mar. 2001, 17 pages.
Neyman et al., "On the Two Different Aspects of the Representative Method: The Method of Stratified Sampling and the Method of Purposive Selection", Journal of the Royal Statistical Society, vol. 97, No. 4, dated Jun. 1934, 68 pages.
Zhou et al., "Database Meets AI: A Survey", IEEE Transactions on Knowledge and Data Engineering, https://ieeexplore.ieee.org/document/9094012>, May 2020, 20 pages.
Rojas et al., "Sampling Techniques to Improve Big Data Exploration", IEEE 7th Symposium on Large Data Analysis and Visualization, dated 2017, 10 pages.
Sun et al., "Cost-Sensitive Boosting for Classification of Imbalanced Data", Pattern Recognition, vol. 40, Iss. 12, Dec. 2007, 181 pages.
Tomek et al., "Two Modifications of CNN", IEEE Transactions on Systems, Man, and Cybernetics, vol. 6, No. 11, dated 1976, 4 pages.
Venkateswarlu at al., "Investigate the Impact of Dataset Size on the Performance of Data Mining Algorithms", International Journal of Innovative Research in Engineering & Management, vol. 3, No. 2, dated Mar. 2016, 8 pages.
Wasikowski et al., "Combating the Small Sample Class Imbalance Problem Using Feature Selection", IEEE Transactions on Knowledge and Data Engineering, vol. 22, Iss. 10, dated Oct. 2010, 105 pages.
Yan et al., "Utilizing Concept Correlations for Effective Imbalanced Data Classification", in Proceedings of the IEEE 15th International Conference on Information Reuse and Integration, dated Aug. 2014, 8 pages.
Yusof et al., "Techniques for Handling Imbalanced Datasets when Producing Classifier Models", Journal of Theoretical and Applied Information Technology, vol. 95, No. 7, dated Apr. 2017, 17 pages.
Zhang et al., "A Strategy to Apply Machine Learning to Small Datasets in Materials Science", Npj Computational Materials, vol. 4, No. 1, dated May 2018, 8 pages.
Longadge et al., "Class Imbalance Problem in Data Mining: Review", https://arxiv.org/abs/1305.1707, dated May 2013, 6 pages.

\* cited by examiner

ADAPTIVE SAMPLING FOR IMBALANCE MITIGATION AND DATASET SIZE REDUCTION IN MACHINE LEARNING

CROSS-REFERENCE TO RELATED APPLICATIONS; BENEFIT CLAIM

This application claims the benefit of Provisional Appln. 62/840,194, filed Apr. 29, 2019, the entire contents of which is hereby incorporated by reference as if fully set forth herein, under 35 U.S.C. § 119 (e).

FIELD OF THE DISCLOSURE

The present disclosure relates to adaptive sampling of datasets that are used in machine learning (ML) models. The use of adaptive sampling described herein helps to provide an efficient and scalable ML pipeline while attaining good ML-model performance.

BACKGROUND

With ever-growing data generation rates, on-the-fly analytics are becoming increasingly useful for data-driven applications. Using machine learning, such as deep learning (DL), to perform data modeling is a technique to address this growing trend. Although many existing ML pipelines provide high model performance, they may not be sufficiently scalable or efficient to enable on-the-fly analytics. For instance, existing ML pipelines may not be designed to handle large datasets and imbalanced datasets in a timely manner without compromising on model performance.

Large dataset size can lead to prolonged training, tuning, and validation processes of an ML model, which may consequently limit the efficiency, acceptance, and use of the model and dataset. Some approaches to address the issue of dataset size focus on the dataset itself while performing an under-sampling strategy to decrease the dataset size and thereby reduce resource requirements of the training and tuning processes. Shortcomings of these approaches include insufficient or excessive sampling, which may result in suboptimal efficiency and/or score performance. These approaches may also have narrow scope of application in their respective domains and may not be well suited for broad use.

An imbalanced dataset can cause an ML model to be biased toward over-represented classes, which can lead to inaccurate predications from the model. Generally, an imbalanced dataset includes one or more classes that are much greater in size than one or more other classes. Illustratively, an imbalanced dataset may include classes A and B, in which class A includes 100,000 samples and class B includes 1,000 samples. Applying an ML model to an imbalanced or biased dataset is undesirable for anomaly detection use-cases, for instance, in which under-represented classes may be more valuable to obtain good results but may have an insignificant impact on the model. There are approaches that seek to address the issue of imbalanced datasets. However, these approaches tend to focus either on a dataset or on a model only, and are not well-adapted to tailor dataset sampling to optimize the outcome from unique combinations of data characteristics and a model of interest.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the example embodiment(s) of the present disclosure. It will be apparent, however, that the example embodiment(s) may be practiced without these specific details. In other instances, well-known structures and devices are shown in block diagram form in order to avoid unnecessarily obscuring the example embodiment(s).

General Overview

Described herein is an adaptive data-sampling (ADS) technique that is performed to reduce resource requirements while maintaining good ML model performance. The ADS technique is widely applicable across different stages of an ML application or pipeline during training and tuning. Further, the ADS technique is useful because it concurrently addresses the challenges of dataset oversize and imbalance.

The ADS technique sub-samples datasets while balancing between efficiency and model performance of a given ML model. Generally, model performance refers to the quality or the "goodness-of-fit" of the ML model. The model performance may be characterized by a validation score, such as a cross-validation score. Efficiency generally refers to the ability to attain good model performance with fewer resources, such as compute time and hardware requirements.

The ADS technique provides flexibility by allowing tradeoffs between speed and score performance for a given dataset and model. The ADS technique takes a model of interest into consideration when evaluating subsamples of a dataset, which helps to obtain more useful results from a given ML model.

More particularly, the ADS technique utilizes an iterative greedy approach with a performance evaluation on a model of interest within each iteration. The ADS technique starts with smaller subsamples of a large dataset and greedily increase the number of samples to converge on a good validation score. This combination provides a quality prediction for each iteration as a reference to determine when to end the iterations based on whether stopping criteria are satisfied. As a result, the ADS technique is effective at maintaining high model performance by avoiding excessive or unproductive sub-sampling and while reducing class redundancy in the dataset. The joint evaluations of a model and dataset sample helps to maintain good model performance and dataset information, which helps to achieve optimal balance between speed and score performance.

The stopping criteria of the ADS techniques include a first threshold based on change in validation scores between iterations, and a second threshold based on consecutive iterations that satisfy the first threshold. The stopping criteria and other ADS parameters are customizable for different situations or needs to allow the ADS technique to achieve a desired balance between speed and validation score.

The ADS technique could be applied on many different algorithms, such as automated machine leaning or AutoML pipelines, to obtain reduced dataset size benefits and minimal degradation in score performance benefits. Reducing dataset size helps to provide a benefit in making hyperparameter exploration tractable based on representative, smaller subsets of a larger dataset. In addition, reducing dataset size helps to provide a benefit in decreased training and tuning time. Decreased training and tuning time tends to reduce hardware requirements for implementing ML models, which in turn, allows users with fewer resources to adopt and implement ML models for their data processing applications. In addition, the ADS techniques retain good score performance for a dataset and model of interest, which amplifies the value of the time saving effort due to minimal inherent tradeoff between better performance and faster speed. Overall, the ADS technique can be usefully applied on various datasets with any model of investigation because of its adaptiveness and versatility.

Example Adaptive Data-Sampling Technique

Use of ML models is spreading through industries as a ubiquitous tool for various purposes. For instance, ML models are used in target/object classification and regression tasks. Generally, a classification task can relate to determining which class a data entry in a dataset belongs to from attributes of that data entry. For example, given a list of animal attributes, such as head shape, nose length, tail length, and weight, a classification task could be to identify what animal class (e.g., dog, cat, horse, etc.) the attributes belong to. A regression task is similar to a classification task, but instead of identifying a discrete class to which a data entry belongs to, the regression task is to infer a numeric value, for instance, predicting a market price of a house.

Figure 1:
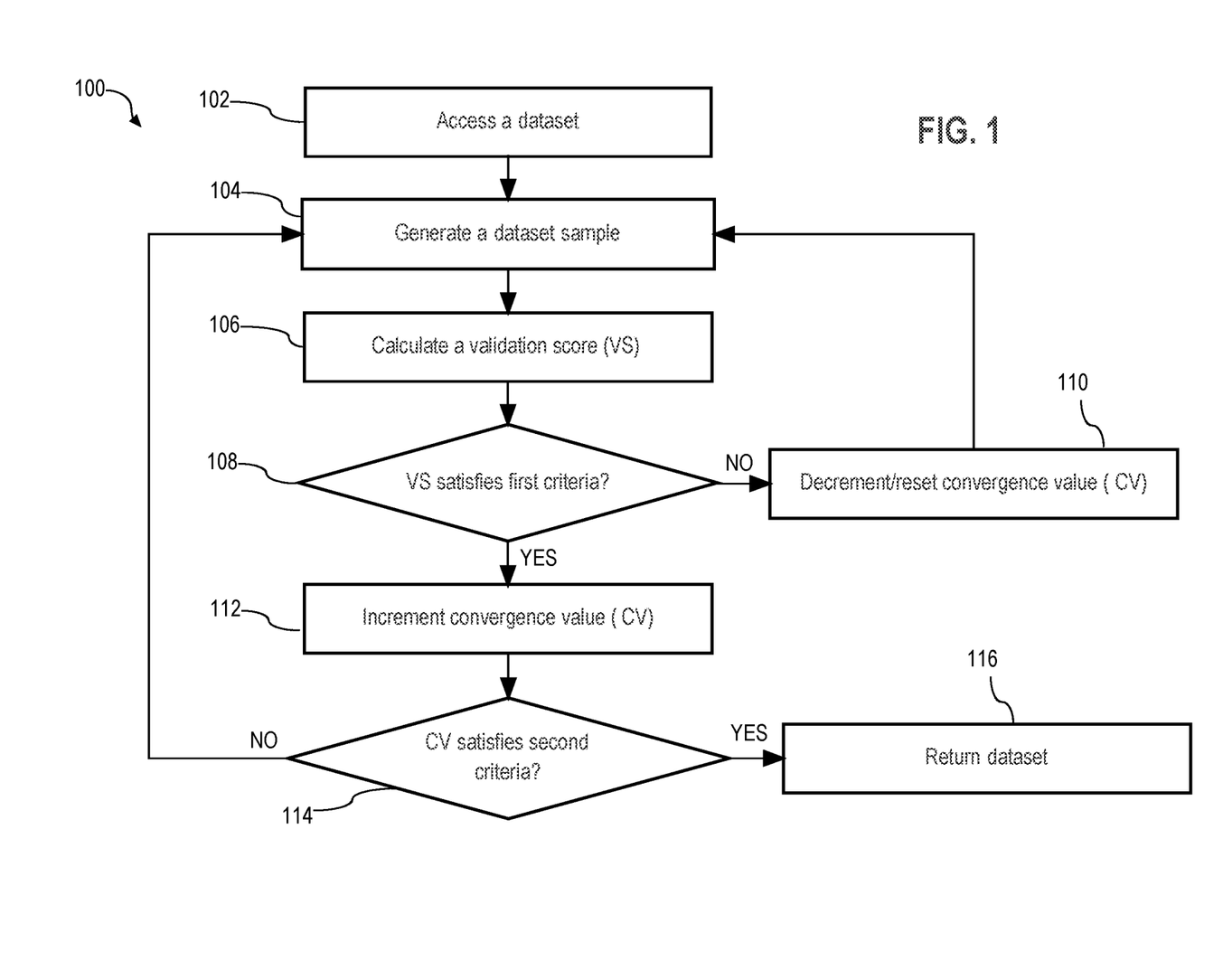
FIG. 1 is a flow diagram an adaptive data-sampling technique according to an embodiment.

FIG. 1 is a flow diagram or process 100 of an ADS technique according to an embodiment. A computing system including one or more processors of a rack server, a personal computer, a mainframe, a virtual computer, or other computing device may be configured to perform the ADS technique of FIG. 1. At block 102, a computing system accesses a given dataset to be used in an ML model. The dataset may include a plurality of classes, and data samples in each class represents features or attributes. In an example, a given dataset includes three classes A, B, and C, in which class A has 200,000 samples, class B has 50,000 samples, and class C has 1,000 samples.

At block 104, the computing system begins an iteration of the ADS technique by under-sampling the dataset to generate a dataset sample or subsample of the original dataset. The computing system may perform random under-sampling to generate the dataset sample. In an example of random under-sampling applied to the three-class dataset above, the computing system generates a dataset sample with the same three classes A, B, and C by randomly selecting a number of samples from each original class A, B, and C. In this example, the computing system determines the number of samples based on ADS parameters, which are customizable. For instance, the ADS parameters may specify a minimum class size of 100 samples, and so, the computing system randomly selects 100 samples from each original class A, B, and C to generate the dataset sample. The randomly selected 100 samples are included into respective classes A, B, and C of the dataset sample. At block 104, the computing system, after generating the dataset sample, modifies the ADS parameters to increase the number of minimum samples per class by a customizable factor (e.g., 1.5). If there is a subsequent iteration of block 104, the computing device is configured to use the increased number of minimum samples per class to generate a new, larger dataset sample.

The computing system may also use other sampling approaches, such as stratified sampling or imbalanced sampling. Stratified sampling is an approach that samples classes proportionally to create a subsampled dataset. Applying stratified sampling to the above-noted dataset could result in a subsampled dataset that includes a number of samples from each class in proportion with the size of each class relative to the dataset, e.g., 20,000 samples from class A, 5,000 samples from class B, and 100 samples from class C. Imbalanced sampling includes, for example, an approach that uses a clustering algorithm that is applied to find mean or center samples of each class and select a number of closest samples to that mean or center.

At block 106, the computing system evaluates model performance on a model of interest and the subsampled dataset. In an embodiment, the computing system evaluates model performance by calculating a validation score (VS), such as a cross-validation score, for the generated subsampled dataset using the model of interest. In another embodiment, the computing system evaluates model performance for a regression task by calculating the validation score using a mean squared error, for example.

According to the process 100, the computing system determines whether to end the iterations based on whether stopping criteria are met. The stopping criteria includes two parts, which are represented by blocks 108 and 114. At block 108, the computing system determines whether the model performance satisfies a first criteria. According to an example, the computing system determines whether a difference between a validation score calculated at block 106 of the present iteration and a validation score calculated at block 106 of a previous iteration satisfies a first threshold. In this example, the present and previous iterations may be consecutive iterations. If the difference in validation scores falls within the first threshold, for instance, by being less than a given threshold value (e.g., 0.01), the computing system determines that the first criteria is satisfied.

If the first criteria is not satisfied, at block 110, the computing system updates a convergence value to decrementing the convergence value or resetting the convergence value to zero. The computing system then generates another dataset sample at block 104. More particularly, in subsequent iterations of block 104, the computing system generates a new, larger dataset sample based on the increased number of samples from each class.

If the first criteria is satisfied, at block 112, the computing system updates the convergence value by incrementing the convergence value. Then, at block 114, the computing system determines whether a second criteria is satisfied. According to an example, the computing system uses the updated convergence value to determine whether a number of consecutive iterations for which the first condition (the first threshold) has been met exceeds a second threshold, which is a number of required consecutive iterations (e.g., 0, 1, 2, 3, etc.). The convergence value represents the number of consecutive iterations for which the first condition has been met.

If the second criteria is satisfied, at block 116, the computing system returns the present sampled dataset, which is a subsample of the original dataset that helps to reduce resource requirements and also provides good performance of the ML model of interest.

If the second criteria is not satisfied, the computing system generates another dataset sample at block 104. More particularly, in subsequent iterations of block 104, the computing system generates a larger dataset sample based on the modified ADS parameters and increased number of samples from each class.

Table 1 provides example pseudo code or algorithm that may be executed by one or more processors of the computing system to perform the ADS technique of FIG. 1.

TABLE 1

```
repeat
    for i = 1 to nClasses do
        c_i^j ← Random UnderSampler(c, min(msc, |c_i|))
    end for
    D_s ← U_{i-1}^{nClasses} c_i^j           ▷ sampled dataset
    vs^j = Eval(M, D_s)                      ▷ current validation score
    msc ← msc · α
    if vs_j − vs_{j−1} < threshold_1 then
        convergence += 1
    else
        convergence = 0
until convergence > threshold_2
return D_s
```

ADS parameters are used to control and define the algorithm and include a class-size parameter (msc), a growth factor of class size (α), score difference threshold parameter, and a threshold for consecutive number of convertences. More particularly, msc specifies a number of minimum samples in each class of a dataset, with a given dataset potentially including more than one class. In the example pseudo code of Table 1, $c_i$ refers to the original number of samples in a class i, and $c_i^j$ refers to number of samples selected by RandomUnderSampler from class i during iteration j of sampling. In an embodiment, the one or more processors of the computing system execute the code to generate a dataset sample $D_s$ including one or more classes, but ignores datasets with a majority class size less than msc and dataset classes that have fewer samples than msc ($|c_i|$<msc). In another embodiment, instead of ignoring dataset classes that have fewer samples than msc, the ADS algorithm includes all of the samples of such classes in the dataset sample.

According to the ADS algorithm, msc grows by a factor α with each iteration, which allows the algorithm to start by favoring smaller sample sizes that help to result in negligible score loss. In one example, α=1.5. The threshold parameter threshold_1 is a number that specifies a minimum score change threshold, and corresponds to the first threshold of block 108. The code of Table 1 specifies the score as a validation score (vs) determined by evaluating a model of interest M and the present dataset $D_s$. The parameter threshold_2 corresponds to the second threshold of block 114, and is an integer that specifies minimum consecutive iterations where the score change is below threshold_1. The parameter threshold_2 is compared against the convergence value ("convergence" in Table 1). The convergence value is initially set to zero, and is decremented/reset or incremented depending on whether the first criteria based on threshold_1 is satisfied (see also blocks 110, 112 of FIG. 1).The stopping criteria are met if the convergence value is greater than threshold_2, at which point the ADS algorithm ends and returns the final sampled dataset $D_s$ of the present iteration. This final sampled dataset will have a negligible score loss on the selected model M under evaluation while also providing significant improvements in runtime.

Technical Benefits and Applications

Figure 2:
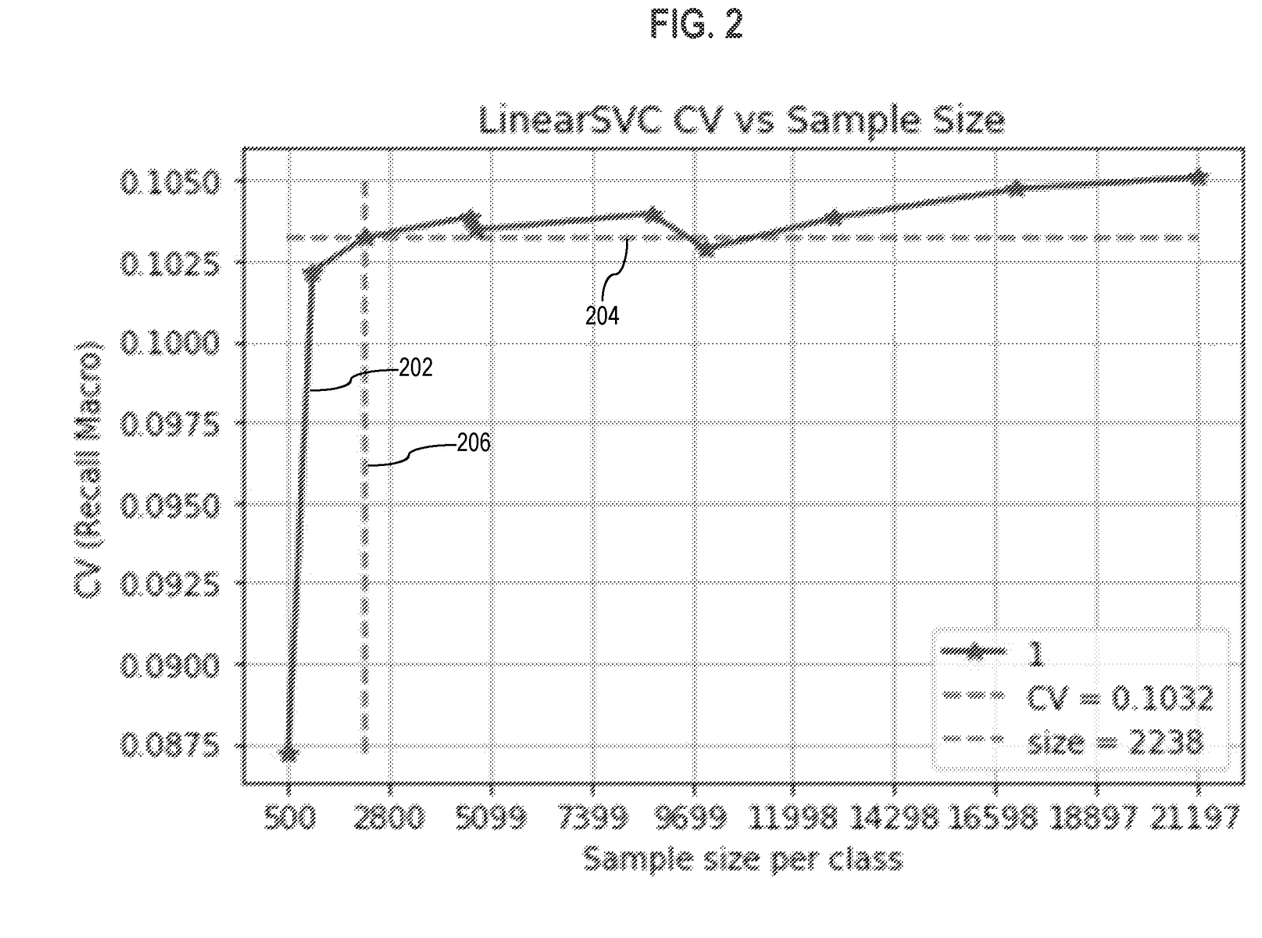
FIG. 2 is a graph showing a relationship between validations score and sample size according to an embodiment.
Figure 3:
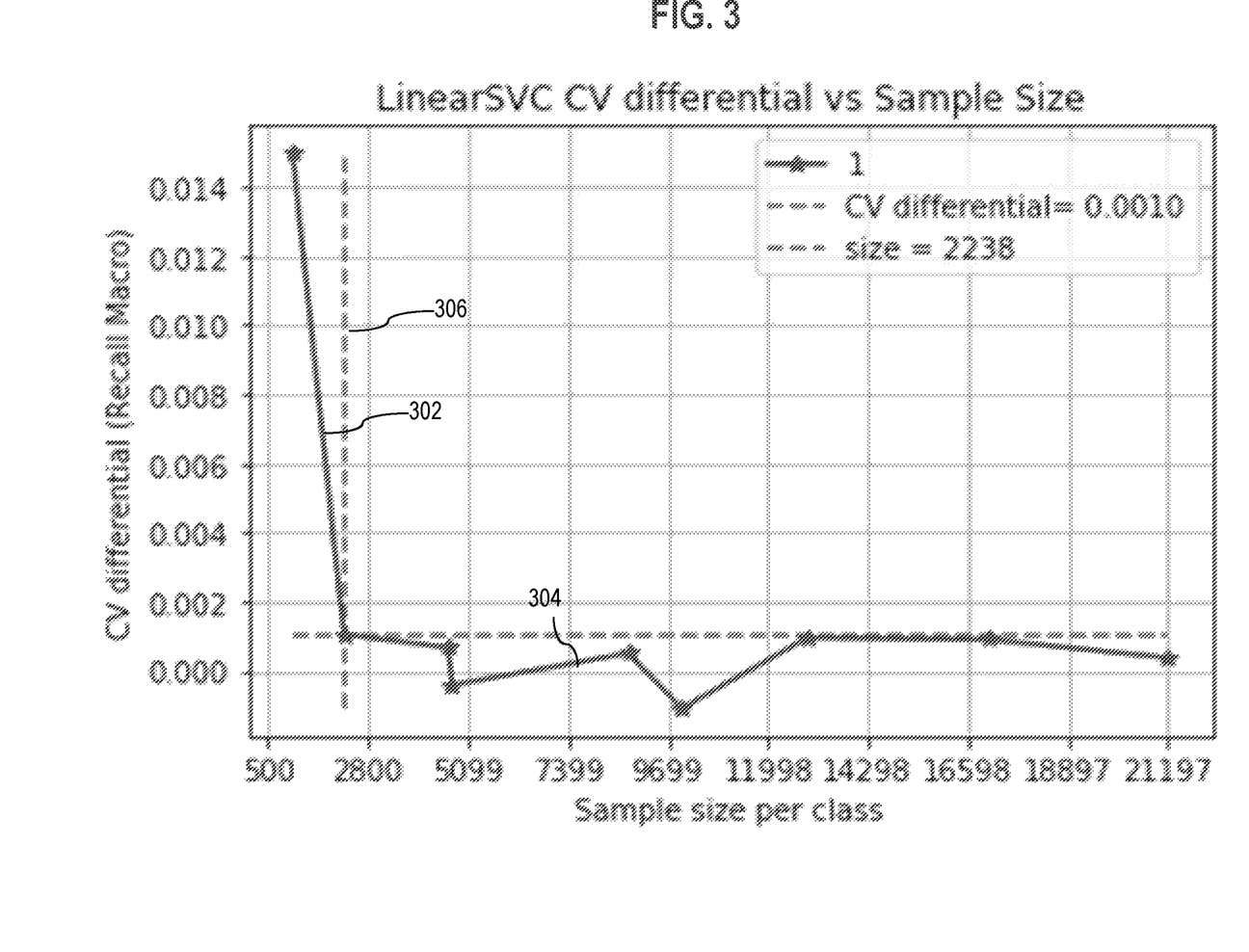
FIG. 3 is a graph showing a relationship between a validation score differential and sample size according to an embodiment.

FIG. 2 and FIG. 3 further demonstrate the ADS processes and effectiveness of the technique. FIG. 2 is a graph showing a relationship between validations scores and sample size according to an embodiment. More particularly, FIG. 2 shows cross-validation (CV) scores 202 from a Linear SVC ML model compared with a number of samples per class. FIG. 3 is a graph showing a relationship between a validation score differential and sample size according to an embodiment. More particularly, FIG. 3 shows differences 302 between two consecutive validation scores of a Linear SVC ML model during performance of an ADS technique compared with a number of samples per class.

In each of FIG. 2 and FIG. 3, an intersection of a horizontal dashed line 204, 304 and a vertical dashed line 206, 306, respectively, represents where the ADS technique would stop and return a dataset sample. FIG. 2 and FIG. 3 demonstrate that the CV score reaches a plateau after an initial rapid increase and then does not change significantly despite increases in dataset sample size (e.g., 500 to 21,197 samples per class). Accordingly, the stopping point of the ADS technique provides good model performance while keeping dataset sample size relatively low, which improves efficiency.

Other benchmarks tests have also been conducted, and the results indicate consistently higher cross-validation scores (0.02 to 0.06 higher) for the present ADS technique over stratified sampling alone for various ML models, such as Ada Boost Classifer, Decision Tree Classifier, Extra Trees Classifier, Gausian NB, Keras MLP Classifier, Linear SVC, Logistic Regression, MLP Classifier, Random Forest Classifier, SVC, and XGB Classifier.

Testing has also shown that the present ADS technique consistently results in higher sample ratios. For instance, the ADS technique has been found to keep about 20% more data points on average compared to stratified sampling with a fixed sample size setting alone. The reason for this is that ADS technique tends to preserve the model score performance while reducing the dataset size.

The ADS technique may also be beneficially integrated into an Automated ML (AutoML) pipeline to reduce the total compute time needed without noticeable score performance loss. According to an embodiment, the ADS technique is applied in a hyper-parameter tuning stage of AutoML, which is generally the most time-consuming of AutoML stages (feature selection, hyper-parameter tuning, and model selection). More particularly, the ADS technique may be used to produce a well-represented subsample of a dataset with the size of the subsample being significantly reduced from the original dataset. Using such a well-represented and smaller dataset subsample helps to considerably reduce the computational burden of hyper-parameter evaluation and tuning, which yields a time-saving benefit for the hyper-parameter process and the overall pipeline. As a further result, using the ADS technique in AutoML expands the use cases and makes AutoML more attractive for adoption by various projects.

Testing has indicated that integrating the ADS technique into AutoML reduces the total time of performing an AutoML pipeline by about half on average compared to an AutoML pipeline without the ADS technique. Further, testing has shown that integrating the ADS technique in AutoML may cause a negligible score performance loss on recall macro of about 0.003. Further, the versatility of the ADS technique allows the technique to be applied on other stages of the AutoML pipeline to provide further benefits.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
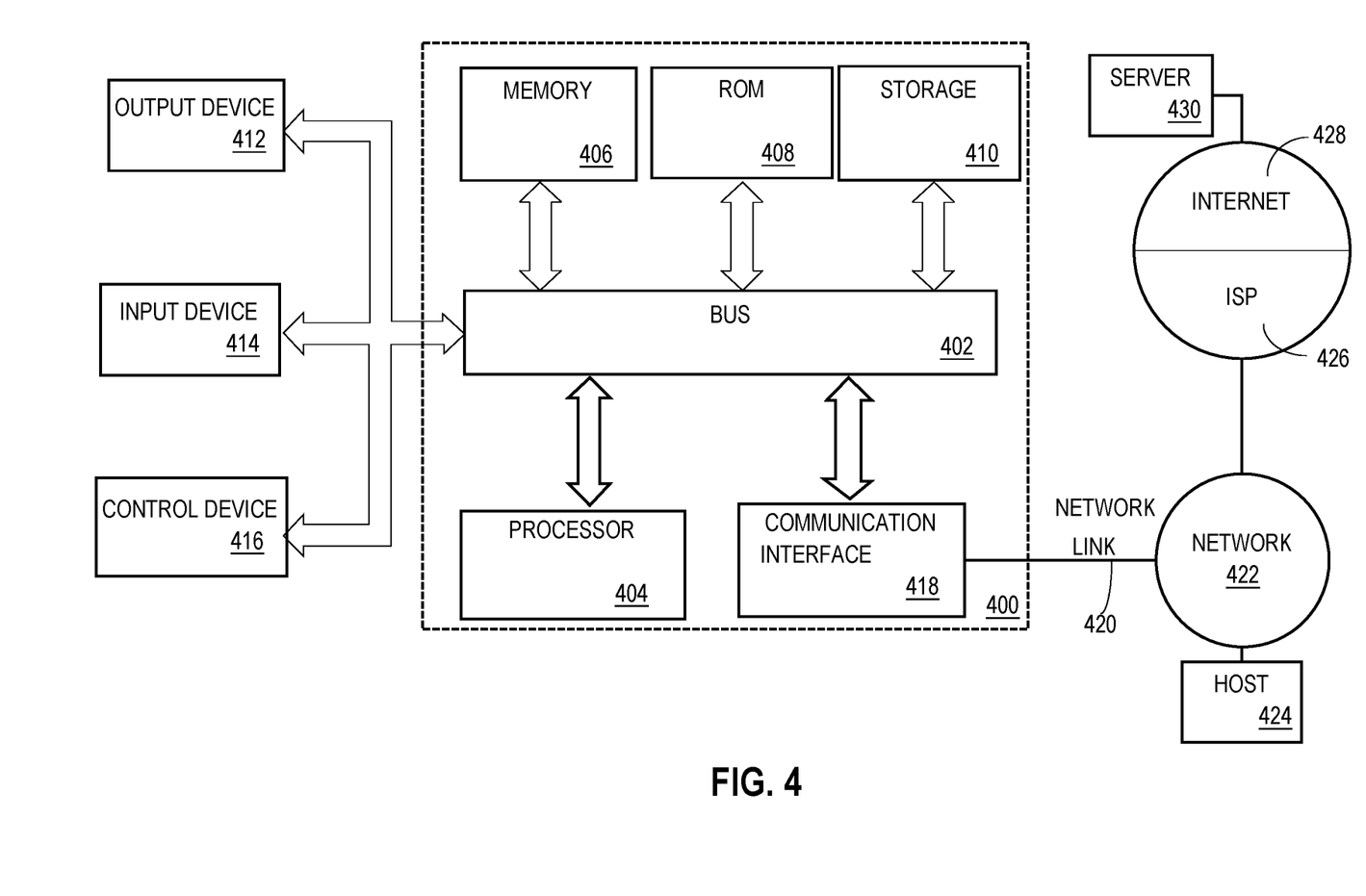
FIG. 4 is a block diagram that illustrates a computer system upon which an embodiment of the disclosure may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to an output device 412, such as a display, for displaying information to a computer user. An input device 414, including alphanumeric and other keys, is coupled to bus 402 for communicating information and command selections to processor 404. Another type of user input device is control device 416, such as a mouse, a trackball, or cursor direction keys for communicating direction information and command selections to processor 404 and for controlling cursor movement on output device 412. This control device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in memory 406. Such instructions may be read into main memory 406 from another storage medium, such as storage device 410. Execution of the sequences of instructions contained in memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic, or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
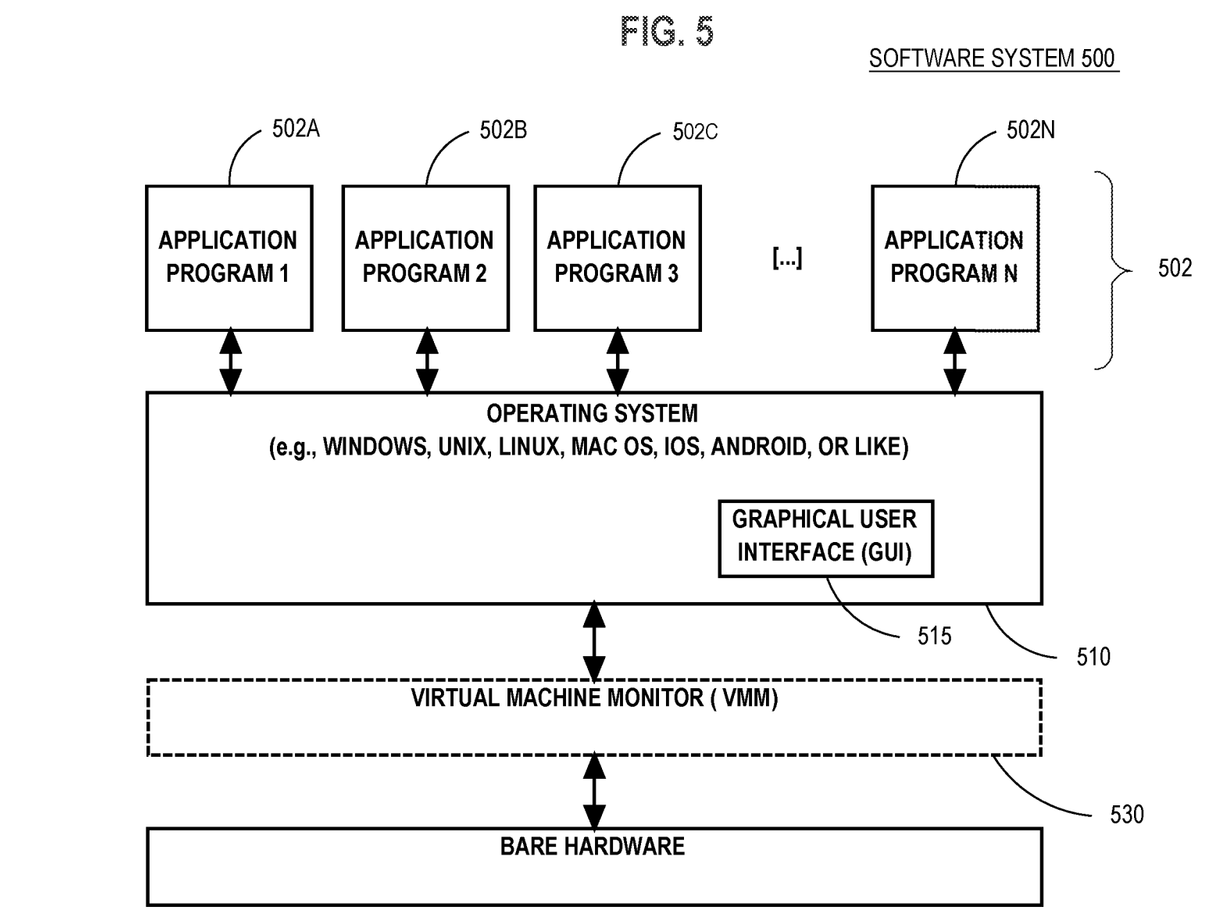
FIG. 5 is a block diagram that illustrates a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 500 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Machine Learning Models

A machine learning model is trained using a particular machine learning algorithm. Once trained, input (e.g., a dataset) is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process executing a machine learning algorithm applies the model artifact against the input to generate a predicted output. A computer system process executes a machine learning algorithm by executing software configured to cause execution of the algorithm.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix-based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Autoencoder implementation and integration techniques are taught in related U.S. patent application Ser. No. 14/558,700, entitled "AUTO-ENCODER ENHANCED SELF-DIAGNOSTIC COMPONENTS FOR MODEL MONITORING". That patent application elevates a supervised or unsupervised ANN model as a first-class object that is amenable to management techniques such as monitoring and governance during model development such as during training.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising in each iteration of a sequence of iterations:
   generating a first dataset sample from a dataset, wherein the first dataset sample is a subset of the dataset;
   cross-validating, based on the first dataset sample, a machine learning model;
   calculating a first validation score for the first dataset sample and the machine learning model;
   determining whether a difference in validation score between the first validation score and a second validation score from a previous iteration of the sequence of iterations satisfies a first criteria;
   if the difference in validation score does not satisfy the first criteria:
   a) generating a second dataset sample from the dataset, wherein:
      the second dataset sample is a subset of the dataset, and
      the second dataset sample is larger than the first dataset sample; and
   b) performing a next iteration using the second dataset sample as the first dataset sample;
   if the difference in validation score does satisfy the first criteria:
   a) updating a convergence value;
   b) determining whether the updated convergence value satisfies a second criteria;
   c) if the updated convergence value satisfies the second criteria, returning the first dataset sample; and
   d) if the updated convergence value does not satisfy the second criteria,
      generating the second dataset sample from the dataset;
   wherein the method is performed by one or more computers.

2. The method of claim 1, further comprising:
   calculating a third validation score for the second dataset sample and the machine learning model;
   determining whether a difference in validation score between the third validation score and the first validation score meets the first criteria;
   if the difference in validation score between the third validation score and the first validation score does not meet the first criteria, generating a third dataset sample from the dataset, wherein the third dataset sample is a subset of the dataset;
   if the difference in validation scores between the third validation score and the first validation score does meet the first criteria:
   updating the convergence value;
   determining whether the updated convergence value meets the second criteria;
   if the updated convergence value meets the second criteria, returning the second dataset sample;
   if the updated convergence value does not meet the second criteria, generating the third dataset sample from the dataset.

3. The method of claim 1, wherein the difference in validation score between the first validation score and a second validation score meets the first criteria when the difference in validation score is less than a first threshold value.

4. The method of claim 3, wherein the updated convergence value meets the second criteria when the updated convergence value is greater than a second threshold value.

5. The method of claim 1, wherein the dataset includes a plurality of classes, and wherein generating the first dataset sample further comprises under-sampling each of the plurality of classes that has a class size greater than a class-size parameter.

6. The method of claim 5, further comprising:
   if the difference in validation scores does not meet the first criteria, increasing the class-size parameter by a growth factor, and generating the second dataset sample from the dataset by under-sampling each of the plurality of classes that has a class size greater than the increased class-size parameter;
   if the updated convergence value does not meet the second criteria, increasing the class-size parameter by the growth factor, and generating the second dataset sample from the dataset by under-sampling each of the plurality of classes that has a class size greater than the increased class-size parameter.

7. The method of claim 1, wherein the second dataset sample has a greater size than the first dataset sample.

8. The method of claim 1, wherein each of generating the first dataset sample and generating the second dataset sample includes performing a random under-sampling of the dataset.

9. The method of claim 1, wherein each of the first validation score and the second validation score is a cross-validation score calculated for a respective dataset sample and machine learning model.

10. The method of claim 1, wherein if the difference in validation scores does not meet the first criteria, resetting the convergence value.

11. One or more non-transitory computer-readable storage medium storing instructions, which when executed by one or more processors cause the one or more processors to perform functions comprising in each iteration of a sequence of iterations:
    generating a first dataset sample from a dataset, wherein the first dataset sample is a subset of the dataset;
    cross-validating, based on the first dataset sample, a machine learning model;
    calculating a first validation score for the first dataset sample and the machine learning model;
    determining whether a difference in validation score between the first validation score and a second validation score from a previous iteration of the sequence of iterations satisfies a first criteria;
    if the difference in validation score does not satisfy the first criteria:
    a) generating a second dataset sample from the dataset, wherein:
       the second dataset sample is a subset of the dataset, and
       the second dataset sample is larger than the first dataset sample; and
    b) Performing a next iteration using the second dataset sample as the first dataset sample;
    if the difference in validation score does satisfy the first criteria:
    a) updating a convergence value;
    b) determining whether the updated convergence value satisfies a second criteria;

c) if the updated convergence value satisfies the second criteria, returning the first dataset sample; and
d) if the updated convergence value does not satisfy the second criteria,
generating the second dataset sample from the dataset.

12. The one or more non-transitory computer-readable storage medium of claim 11 storing instructions, which when executed by one or more processors cause the one or more processors to perform functions comprising:
calculating a third validation score for the second dataset sample and the machine learning model;
determining whether a difference in validation score between the third validation score and the first validation score meets the first criteria;
if the difference in validation score between the third validation score and the first validation score does not meet the first criteria, generating a third dataset sample from the dataset, wherein the third dataset sample is a subset of the dataset;
if the difference in validation scores between the third validation score and the first validation score does meet the first criteria:
updating the convergence value;
determining whether the updated convergence value meets the second criteria;
if the updated convergence value meets the second criteria, returning the second dataset sample;
if the updated convergence value does not meet the second criteria, generating the third dataset sample from the dataset.

13. The one or more non-transitory computer-readable storage medium of claim 11, wherein the difference in validation score between the first validation score and a second validation score meets the first criteria when the difference in validation score is less than a first threshold value.

14. The one or more non-transitory computer-readable storage medium of claim 13, wherein the updated convergence value meets the second criteria when the updated convergence value is greater than a second threshold value.

15. The one or more non-transitory computer-readable storage medium of claim 11,
wherein the dataset includes a plurality of classes;
the one-or more non-transitory computer-readable storage medium further storing instructions, which when executed by one or more processors cause the one or more processors to perform the function of generating the first dataset sample by under-sampling each of the plurality of classes that has a class size greater than a class-size parameter.

16. The one or more non-transitory computer-readable storage medium of claim 15 storing instructions, which when executed by one or more processors cause the one or more processors to perform functions comprising:
if the difference in validation scores does not meet the first criteria, increasing the class-size parameter by a growth factor, and generating the second dataset sample from the dataset by under-sampling each of the plurality of classes that has a class size greater than the increased class-size parameter;
if the updated convergence value does not meet the second criteria, increasing the class-size parameter by the growth factor, and generating the second dataset sample from the dataset by under-sampling each of the plurality of classes that has a class size greater than the increased class-size parameter.

17. The one or more non-transitory computer-readable storage medium of claim 11, wherein the second dataset sample has a greater size than the first dataset sample.

18. The one or more non-transitory computer-readable storage medium of claim 11 storing instructions, which when executed by one or more processors cause the one or more processors to perform functions comprising:
generating the first dataset sample by performing a random under-sampling of the dataset;
generating the second dataset sample by performing a random under-sampling of the dataset.

19. The one or more non-transitory computer-readable storage medium of claim 11, wherein each of the first validation score and the second validation score is a cross-validation score calculated for a respective dataset sample and machine learning model.

20. The one or more non-transitory computer-readable storage medium of claim 11 storing instructions, which when executed by one or more processors cause the one or more processors to perform functions comprising, if the difference in validation scores does not meet the first criteria, resetting the convergence value.

* * * * *

UNITED STATES PATENT AND TRADEMARK OFFICE
CERTIFICATE OF CORRECTION

PATENT NO. : 11,562,178 B2  
APPLICATION NO. : 16/718164  
DATED : January 24, 2023  
INVENTOR(S) : Cai et al.

Page 1 of 2

It is certified that error appears in the above-identified patent and that said Letters Patent is hereby corrected as shown below:

On the Title Page

In the illustrative figure, under Reference Numerals 110 and 112, Line 1, delete "( CV)" and insert -- (CV) --.

On page 2, Column 1, under Other Publications, Line 2, delete "Algotithm" and insert -- Algorithm --, therefor.

On page 2, Column 1, under Other Publications, Line 8, delete "Lage Traning" and insert -- Large Training --, therefor.

On page 2, Column 1, under Other Publications, Line 15, delete "Performace"," and insert -- Performance", --, therefor.

On page 2, Column 1, under Other Publications, Line 22, delete "31 st" and insert -- 31st --, therefor.

On page 2, Column 1, under Other Publications, Line 29, delete "Machinelearning," and insert -- Machine learning, --, therefor.

On page 2, Column 2, under Other Publications, Line 63, delete "r -th" and insert -- r-th --, therefor.

In the Drawings

On sheet 1 of 5, in FIG. 1, under Reference Numeral 110, Line 1, delete "( CV)" and insert -- (CV) --, therefor.

On sheet 1 of 5, in FIG. 1, under Reference Numeral 112, Line 1, delete "( CV)" and insert -- (CV) --, therefor.

Signed and Sealed this  
Nineteenth Day of December, 2023

Katherine Kelly Vidal  
*Director of the United States Patent and Trademark Office*

On sheet 5 of 5, in FIG. 5, under Reference Numeral 530, Line 1, delete "( VMM)" and insert -- (VMM) --, therefor.

In the Specification

In Column 2, Line 17, delete "implemented;" and insert -- implemented. --, therefor.

In Column 6, Line 35, delete "Ada Boost Classifer," and insert -- AdaBoost Classifier, --, therefor.

In Column 6, Line 36, delete "Gausian" and insert -- Gaussian --, therefor.

In Column 13, Line 2, delete "and or" and insert -- and/or --, therefor.

In the Claims

In Column 16, Line 61, in Claim 11, delete "Performing" and insert -- performing --, therefor.

In Column 17, Line 45, in Claim 15, delete "one-or" and insert -- one or --, therefor.